US008069175B2

(12) United States Patent
Hillis et al.

(10) Patent No.: US 8,069,175 B2
(45) Date of Patent: Nov. 29, 2011

(54) DELEGATING AUTHORITY TO EVALUATE CONTENT

(75) Inventors: W. Daniel Hillis, Encino, CA (US); Bran Ferren, Beverly Hills, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/731,011

(22) Filed: Mar. 24, 2010

(65) Prior Publication Data

US 2010/0185626 A1 Jul. 22, 2010

Related U.S. Application Data

(63) Continuation of application No. 10/854,662, filed as application No. PCT/US02/11434 on Apr. 10, 2002, now Pat. No. 7,844,610.

(51) Int. Cl.
*G06F 7/00* (2006.01)
*G06F 17/30* (2006.01)

(52) U.S. Cl. ........................................ 707/740; 707/748

(58) Field of Classification Search .................. 707/740, 707/748

See application file for complete search history.

(56) References Cited

U.S. PATENT DOCUMENTS

| | | | |
|---|---|---|---|
| 2,895,005 | A | 7/1959 | Kock et al. |
| 3,116,365 | A | 12/1963 | Prescott |
| 3,992,586 | A | 11/1976 | Jaffe |
| 4,688,443 | A | 8/1987 | Fabre et al. |
| 4,847,784 | A | 7/1989 | Clancey |
| 4,853,873 | A | 8/1989 | Tsuji et al. |
| 4,881,135 | A | 11/1989 | Heilweil |
| 4,992,940 | A | 2/1991 | Dworkin |
| 4,996,642 | A | 2/1991 | Hey |
| 5,073,934 | A | 12/1991 | Matyas et al. |
| 5,117,258 | A | 5/1992 | Iwata |
| 5,133,045 | A | 7/1992 | Gaither et al. |

(Continued)

FOREIGN PATENT DOCUMENTS

EP 1182590 2/2002

(Continued)

OTHER PUBLICATIONS

Nelson, C., "Use of Metadata Registries for Searching for Statistical Data," Jul. 24-26, 2002, Dimension EDI Ltd., Proceedings of the 14th International Conference on Scientific and Statistical Database Management, pp. 232-235.

(Continued)

*Primary Examiner* — Robert Timblin
*Assistant Examiner* — Mariela D Reyes
(74) *Attorney, Agent, or Firm* — Fish & Richardson P.C.

(57) ABSTRACT

The invention provides an evaluation system for reliably evaluating large amounts of content. The evaluation system is managed by a primary authority that designates one or more contributing authorities by delegating to each a specific quantity of authority. Each contributing authority may in turn designate and delegate authority to one or more additional contributing authorities, subject to the restriction that the total quantity of authority delegated does not exceed the quantity of authority the contributing authority was itself delegated. Each contributing authority, and optionally the primary authority itself, may evaluate one or more portions of content by associating a rating with each evaluated portion of content. A composite rating for a particular portion of content may then be determined based upon the ratings associated with the portion of content. Preferably, the ratings are combined in a manner that affords a higher priority to the ratings provided by contributing authorities to which a greater quantity of authority was delegated.

34 Claims, 4 Drawing Sheets

U.S. PATENT DOCUMENTS

| | | | |
|---|---|---|---|
| 5,212,768 | A | 5/1993 | Itsuki et al. |
| 5,404,295 | A | 4/1995 | Katz et al. |
| 5,404,305 | A | 4/1995 | Stiles, Jr. |
| 5,426,510 | A | 6/1995 | Meredith |
| 5,430,473 | A | 7/1995 | Beecher, II et al. |
| 5,500,671 | A | 3/1996 | Anderson et al. |
| 5,511,122 | A | 4/1996 | Atkinson |
| 5,597,312 | A | 1/1997 | Bloom et al. |
| 5,598,209 | A | 1/1997 | Cortjens et al. |
| 5,612,734 | A | 3/1997 | Nelson et al. |
| 5,678,999 | A | 10/1997 | Cicare |
| 5,701,400 | A | 12/1997 | Amado |
| H001728 | H | 5/1998 | Kelso et al. |
| 5,751,337 | A | 5/1998 | Allen et al. |
| 5,751,809 | A | 5/1998 | Davis et al. |
| 5,832,474 | A | 11/1998 | Lopresti et al. |
| 5,867,799 | A | 2/1999 | Lang et al. |
| 5,907,619 | A | 5/1999 | Davis |
| 5,940,513 | A | 8/1999 | Aucsmith et al. |
| 5,956,404 | A | 9/1999 | Schneier et al. |
| 5,960,411 | A | 9/1999 | Hartman et al. |
| 5,963,245 | A | 10/1999 | McDonald |
| 5,995,624 | A | 11/1999 | Fielder et al. |
| 6,003,021 | A | 12/1999 | Zadik et al. |
| 6,009,173 | A | 12/1999 | Sumner |
| 6,070,149 | A | 5/2000 | Tavor et al. |
| 6,076,091 | A | 6/2000 | Fohn et al. |
| 6,076,163 | A | 6/2000 | Hoffstein et al. |
| 6,098,065 | A | 8/2000 | Skillen et al. |
| 6,125,445 | A | 9/2000 | Arditti et al. |
| 6,131,162 | A | 10/2000 | Yoshiura et al. |
| 6,171,109 | B1 | 1/2001 | Ohsuga |
| 6,185,558 | B1 | 2/2001 | Bowman et al. |
| 6,202,060 | B1 | 3/2001 | Tran |
| 6,202,062 | B1 | 3/2001 | Cameron et al. |
| 6,226,742 | B1 | 5/2001 | Jakubowski et al. |
| 6,230,269 | B1 | 5/2001 | Spies et al. |
| 6,283,757 | B1 | 9/2001 | Meghnot et al. |
| 6,292,211 | B1 | 9/2001 | Pena |
| 6,311,194 | B1 | 10/2001 | Sheth et al. |
| 6,341,960 | B1 | 1/2002 | Frasson et al. |
| 6,347,333 | B2 | 2/2002 | Eisendrath et al. |
| 6,374,237 | B1 | 4/2002 | Reese |
| 6,401,206 | B1 | 6/2002 | Khan et al. |
| 6,405,175 | B1 | 6/2002 | Ng |
| 6,438,691 | B1 | 8/2002 | Mao |
| 6,466,918 | B1 | 10/2002 | Spiegel et al. |
| 6,471,586 | B1 | 10/2002 | Aiki et al. |
| 6,477,520 | B1 | 11/2002 | Malaviya et al. |
| 6,499,105 | B1 | 12/2002 | Yoshiura et al. |
| 6,507,357 | B2 | 1/2003 | Hillis et al. |
| 6,535,880 | B1 | 3/2003 | Musgrove et al. |
| 6,601,075 | B1 | 7/2003 | Huang et al. |
| 6,633,981 | B1 | 10/2003 | Davis |
| 6,691,106 | B1 | 2/2004 | Sathyanarayan |
| 6,704,729 | B1 | 3/2004 | Klein et al. |
| 6,714,234 | B1 | 3/2004 | Hillis et al. |
| 6,732,090 | B2 | 5/2004 | Shanahan et al. |
| 6,751,733 | B1 | 6/2004 | Nakamura et al. |
| 6,772,157 | B2 | 8/2004 | Barnett et al. |
| 6,789,126 | B1 | 9/2004 | Saulpaugh et al. |
| 6,799,176 | B1 | 9/2004 | Page |
| 6,807,535 | B2 | 10/2004 | Goodkovsky |
| 6,827,578 | B2 | 12/2004 | Krebs et al. |
| 6,856,968 | B2 | 2/2005 | Cooley et al. |
| 6,884,074 | B2 | 4/2005 | Theilmann |
| 6,975,833 | B2 | 12/2005 | Theilmann et al. |
| 6,980,974 | B2 | 12/2005 | Kobayashi et al. |
| 6,988,198 | B1 | 1/2006 | Zuccherato et al. |
| 7,000,118 | B1 | 2/2006 | Murthy et al. |
| 7,058,628 | B1 | 6/2006 | Page |
| 7,065,494 | B1 | 6/2006 | Evans |
| 7,080,064 | B2 | 7/2006 | Sundaresan |
| 7,100,051 | B1 | 8/2006 | Kipnis et al. |
| 7,107,218 | B1 | 9/2006 | Preston |
| 7,181,438 | B1 | 2/2007 | Szabo |
| 7,263,529 | B2 | 8/2007 | Cordery et al. |
| 7,263,671 | B2 | 8/2007 | Hull et al. |
| 7,337,389 | B1 | 2/2008 | Woolf et al. |
| 2001/0034837 | A1 | 10/2001 | Kausik et al. |
| 2002/0013780 | A1 | 1/2002 | Brown et al. |
| 2002/0016840 | A1 | 2/2002 | Herzog et al. |
| 2002/0023093 | A1 | 2/2002 | Ziff et al. |
| 2002/0026583 | A1 | 2/2002 | Harrison et al. |
| 2002/0049692 | A1 | 4/2002 | Venkatram |
| 2002/0069079 | A1 | 6/2002 | Vega |
| 2002/0072410 | A1 | 6/2002 | Tanaka et al. |
| 2002/0073080 | A1 | 6/2002 | Lipkin |
| 2002/0091836 | A1 | 7/2002 | Moetteli |
| 2002/0095579 | A1 | 7/2002 | Yoshiura et al. |
| 2002/0126120 | A1 | 9/2002 | Snowdon et al. |
| 2002/0161603 | A1 | 10/2002 | Gonzales |
| 2003/0033298 | A1 | 2/2003 | Sundaresan |
| 2003/0093790 | A1 | 5/2003 | Logan et al. |
| 2003/0134675 | A1 | 7/2003 | Oberberger |
| 2003/0152893 | A1 | 8/2003 | Edgar |
| 2003/0187841 | A1 | 10/2003 | Zhang et al. |
| 2003/0188180 | A1 | 10/2003 | Overney |
| 2003/0195834 | A1 | 10/2003 | Hillis et al. |
| 2004/0001104 | A1 | 1/2004 | Sommerer et al. |
| 2004/0003351 | A1 | 1/2004 | Sommerer et al. |
| 2004/0097852 | A1 | 5/2004 | Boyd et al. |
| 2004/0205448 | A1 | 10/2004 | Grefenstette et al. |
| 2004/0205514 | A1 | 10/2004 | Sommerer et al. |
| 2005/0060283 | A1 | 3/2005 | Petras et al. |
| 2005/0107912 | A1 | 5/2005 | Martin et al. |
| 2005/0119053 | A1 | 6/2005 | Suzuki et al. |
| 2005/0245316 | A1 | 11/2005 | Tanaka et al. |

FOREIGN PATENT DOCUMENTS

| | | |
|---|---|---|
| JP | 04322649 | 11/1992 |
| JP | 08084328 | 3/1996 |
| WO | WO 00/05666 | 2/2000 |
| WO | WO 00/75840 | 12/2000 |
| WO | WO 01/01313 | 1/2001 |

OTHER PUBLICATIONS

Anguish Scott, “Storing your application’s preferences and Support files,” Jan. 14, 1998, Stepwise Server, http://www.stepwise.com.Articles/Technical/ApplicationStorage.html.

Michael Margolis and David Resnick; Third Voice: Vox Populi Vox Dei?; Oct. 1999; First Monday, vol. 4, No. 10; pp. 1-5; downloaded from: worldwideweb.firstmonday.org/issues/issue4_10/margolis/index.html.

Nagao, et al.; “Semantic Annotation and Transcoding: Making Web Content More Accessible”; Apr.-Jun. 2001; IEEE Multimedia.

Kahan, et al.; “Annotea: An Open RDF Infrastructure for Shared Web Annotations”; May 1-5, 2001; ACM, Hong Kong.

DELEGATING AUTHORITY TO EVALUATE CONTENT

RELATED APPLICATIONS

This application is a Continuation of U.S. patent application Ser. No. 10/854,662, now U.S. Pat. No. 7,844,610, entitled DELEGATED AUTHORITY EVALUATION SYSTEM, filed May 25, 2004, which is a National Stage Entry of PCT/US02/11434, filed on Apr. 10, 2002. This application also relates to U.S. patent application Ser. No. 10/474,155, now U.S. Pat. No. 7,502,770, entitled Knowledge Web, filed Oct. 21, 2003; and U.S. patent application Ser. No. 60/529,245 entitled Reputation System, filed Oct. 21, 2003; each of which is incorporated herein in its entirety by this reference thereto.

BACKGROUND

1. Technical Field

The invention relates to systems for assessing the value of content. More particularly, the invention relates to systems for reliably evaluating large amounts of content in a distributed manner.

2. Description of the Prior Art

Many sites found on the World Wide Web allow users to evaluate content found within the site. For example, the Amazon® web site (www.amazon.com) allows users to submit reviews of books listed for sale, including a zero to five star rating. The Slashdot Web site (www.slashdot.org) allows users to "mod" comments recently posted by other users. Based on this information obtained from the users, the system determines a numerical score for each comment ranging from 1 to 5.

Because such systems do empower a great number of users to evaluate content, the scope and extent of the content that may be evaluated is great. However, because there is no restriction on the users that may participate, the reliability of the ratings is correspondingly diminished. In an effort to address this deficiency, such systems often allow users to evaluate the evaluations themselves. For example, Amazon® allows other users to evaluate the submitted reviews by indicating that they found a review helpful. Slashdot allows users to annotate submitted comments with attributes, such as funny or informative. The large number of submitted comments can then be filtered based on these annotations and the numerical score described above. Nonetheless, each of these approaches essentially relies on a mass consensus in which each contributor to the evaluation process is granted equal significance.

However, evaluation systems that adopt a more centralized, more controlled approach, e.g. commissioning a small number of trusted evaluators or editors, are inevitably overwhelmed by the immensity of the content in need of evaluation. Thus, while the reliability of the evaluations may increase, time constraints ensure that the scope and extent of the content evaluated is diminished.

Thus, there is a need for a new system of evaluating content that obviates this apparent tradeoff. Preferably, the evaluation system should be distributed in nature, ensuring that an extremely large amount of content can be evaluated without unduly burdening any individual evaluator. However, the distribution of the evaluation effort should be performed in a manner that preserves the integrity of the evaluation process. The evaluation system should thus provide evaluations for extensive content in a reliable manner.

SUMMARY

The invention provides an evaluation system for reliably evaluating large amounts of content. The evaluation system is managed by a primary authority that designates one or more contributing authorities by delegating to each a specific quantity of authority. Each contributing authority may in turn designate and delegate authority to one or more additional contributing authorities, subject to the restriction that the total quantity of authority delegated does not exceed the quantity of authority the contributing authority was itself delegated.

Each contributing authority, and optionally the primary authority itself, may evaluate one or more portions of content by associating a rating with each evaluated portion of content. A composite rating for a particular portion of content may then be determined based upon the ratings associated with the portion of content.

Preferably, the ratings are combined in a manner that affords a higher priority to the ratings provided by contributing authorities to which a greater quantity of authority was delegated.

Preferably, the quantities of delegated authority and the ratings associated with a portion of content are specified numerically, and the composite rating is determined by a weighted average of the ratings in which the weighting applied to a rating is proportional to the total authority of the authority that provided the rating. Alternatively, the composite rating may be determined using an additive combination of the ratings, a computation of the mode, median, or mean of the ratings, or a count of the ratings. The primary authority, as well as the contributing authorities, may add authorities to the evaluation system by designating and delegating authority to new contributing authorities. Correspondingly, contributing authorities may be removed from the evaluation system through the revocation of authority. By delegating additional authority to, or revoking existing authority from, previously designated contributing authorities, a primary authority or a contributing authority may alter the relative authority of the contributing authorities within the evaluation system.

In this manner, the authority initially instilled within the primary authority is propagated through a distributed network of contributing authorities. Thus, while the potentially large number of designated contributing authorities can effectively evaluate large amounts of content, the delegation of authority ensures that the evaluations remain reliable.

DETAILED DESCRIPTION

The invention provides an evaluation system for reliably evaluating large amounts of content. The evaluation system is managed by a primary authority that designates one or more contributing authorities by delegating to each a specific quantity of authority. Each contributing authority may in turn designate and delegate authority to one or more additional contributing authorities, subject to the restriction that the total quantity of authority delegated does not exceed the quantity of authority the contributing authority was itself delegated.

Each contributing authority, and optionally the primary authority itself, may evaluate one or more portions of content by associating a rating with each evaluated portion of content. A composite rating for a particular portion of content may then be determined based upon the ratings associated with the portion of content. Preferably, the ratings are combined in a manner that affords a higher priority to the ratings provided by contributing authorities to which a greater quantity of authority was delegated.

In this manner, the authority initially instilled within the primary authority is propagated through a distributed network of contributing authorities. Thus, while the potentially large number of designated contributing authorities can effectively evaluate large amounts of content, the delegation of authority ensures that the evaluations remain reliable.

Figure 1:
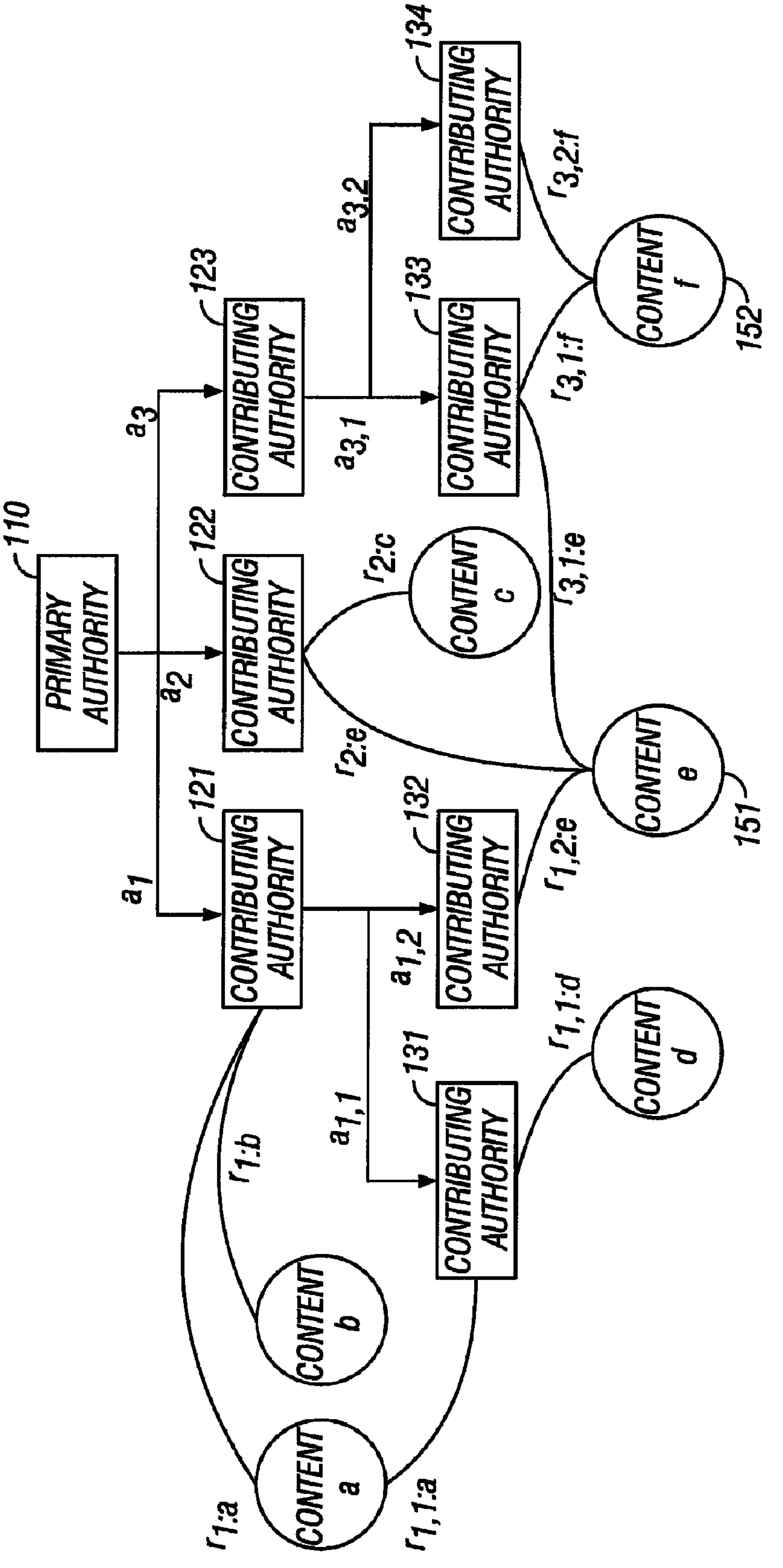
FIG. 1 shows an evaluation system according to a preferred embodiment of the invention.

FIG. 1 shows an evaluation system according to a preferred embodiment of the invention. The reputation system is managed by a primary authority 110. The primary authority has designated several contributing authorities 121, 122, and 123 by delegating to each a specific quantity of authority, namely a1, a2, and a3, respectively. Two of the contributing authorities 121 and 123 have in turn designated additional contributing authorities 131-134, delegating to each quantities of authority $a_{1,1}$, $a_{1,2}$, $a_{3,1}$, and $a_{3,2}$, respectively. In this manner, a chain of authority is established linking the primary authority with each of the contributing authorities within the evaluation system.

As noted previously, the total quantity of authority delegated by each of the contributing authorities is restricted to be less than or equal to the total quantity of authority that the contributing authority was itself delegated. In the example of FIG. 1, it is therefore required that $a_{1,1}+a_{1,2}<=a_1$, and $a_{3,1}+a_{3,2}>=a_3$. Preferably, each contributing authority seeks to maximize its influence within the evaluation system, in which case the total authority delegated by the contributing authority equals the authority it was itself delegated. That is, in the example of FIG. 1, $a_{1,1}+a_{1,2}=a_1$ and $a_{3,1}+a_{3,2}=a_3$.

Preferably, the quantity of authority delegated is represented by a positive number. However, in some embodiments of the invention, the quantity of authority delegated may be negative. In so doing, the designating authority indicates a level of distrust for the designated contributing authority. The quantity of authority delegated may be treated as a negative quantity in determining the total quantity of authority the designated contributing authority may delegate, but treated as a positive quantity in enforcing the restriction on the total quantity of authority that the delegating authority may delegate.

Once authority has been delegated to a contributing authority, it may evaluate portions of content. An authority preferably evaluates many portions of content, and a particular portion of content may be evaluated by more than one authority. The evaluation is performed by associating a rating r with the portion of content. In FIG. 1, a contributing authority 133 has associated a rating $r_{3,1:f}$ with a portion of content 152 and a rating $r_{3,1:e}$ with another portion of content 151, which has also been rated by contributing authorities 122 and 132 with ratings $r_{2:e}$ and $r_{1,2:e}$, respectively.

Preferably, the ratings are numeric in nature, and are constrained to lie between a lower and upper bound that are standardized within the evaluation system. Preferably, the lower and upper bounds are −1 and 1, with −1 indicating a very unfavorable evaluation, and 1 indicating a very favorable evaluation. In other embodiments of the invention, the ratings may range from 0 to 1, with 0 indicating a very unfavorable evaluation. Alternatively, a contributing authority may assign ratings within an arbitrary range of values, with the ratings normalized by the rating with the largest absolute value.

A composite rating for a particular portion of content may be determined based upon the ratings associated with the portion of content. Preferably, the ratings are combined in a manner that affords a higher priority to the ratings provided by contributing authorities to which a greater quantity of authority was delegated. For example the ratings may be combined using a weighted average. For a portion of content given a rating $r_i$ by authority i among N authorities evaluating the portion of content, the composite rating may be defined as $$R = (1/W)\sum_{i=1,N}(w_i r_i), \tag{1}$$

where $w_i$ is the total authority delegated to authority of i, and $$W = \sum_{i=1,N}(w_i) \tag{2}$$

For example, for portion of content 151 in FIG. 1, $$R=(a_{1,2}r_{1,2:e}+a_2 r_{2:e}+a_{3,1}r_{3,1:e})/(a_{1,2}+a_2+a_{3,1}). \tag{3}$$

Other approaches to determining the composite rating are possible. For example, a mean, median, or mode of the ratings may be computed. These methods are not preferred, though, as they do not respect the manner in which authority was delegated among the evaluating authorities. It is also possible to compute a composite rating that reflects the pervasiveness of a portion of content. Most simply, the number of authorities evaluating the content may be counted, providing a direct indication of how widely the content has been disseminated.

Alternatively, the ratings associated with the content may be added. That is, $$R = \sum_{i=1,N}(r_i) \tag{4}$$

In this approach, portions of content that have been rated by many authorities generally have a higher composite rating than those that have been evaluated by only a few authorities. This approach to computing the composite rating may also be used to incorporate the age of the content into the composite rating, because a portion of content presumably receives an increasing number of ratings over time.

Figure 2:
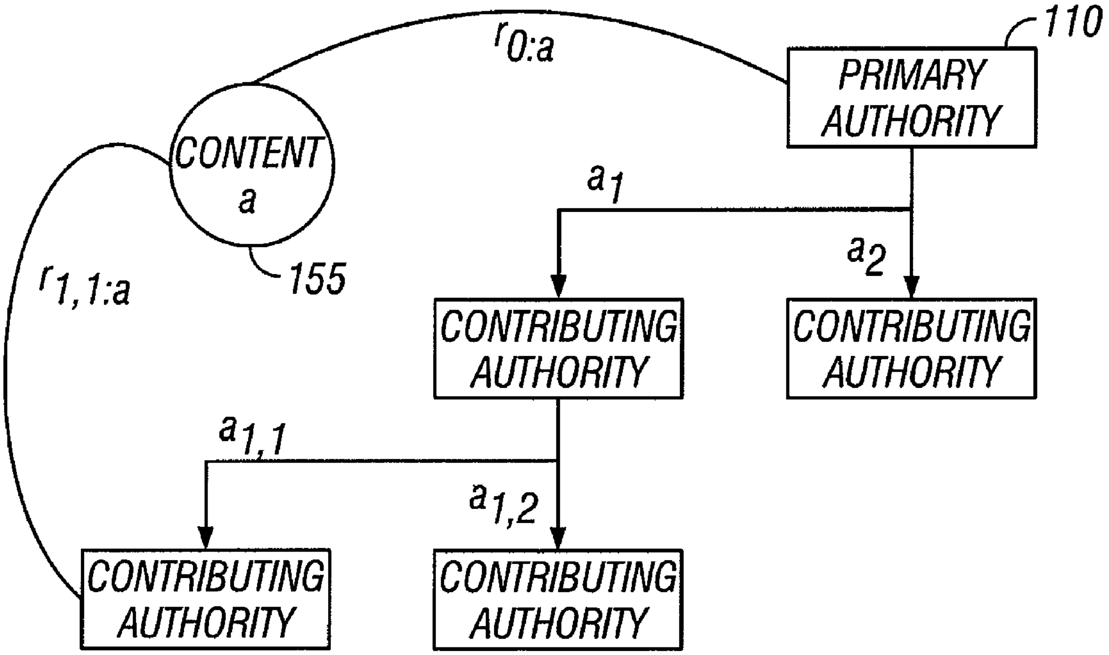
FIG. 2 shows an evaluation system according to a preferred embodiment of the invention in which a primary authority directly evaluates a portion of content.

FIG. 2 shows an evaluation system according to a preferred embodiment of the invention in which a primary authority directly evaluates a portion of content. While it is anticipated that a large number of contributing authorities perform the great majority of evaluations, thereby increasing the amount of content that may be evaluated, the invention does not restrict the primary authority from directly evaluating content itself. To determine the composite rating for a portion of content evaluated directly by the primary authority, the authority associated with the rating given by the primary authority is equal to the sum of all authority delegated by the primary authority. For example, in FIG. 2, the primary authority 110 has evaluated a portion of content 155 by associating with the content a rating $r_{0:a}$. Here, the composite rating is computed as $$R=(a_0 r_{0:a}+a_{1,1} r_{1,1:a})/(a+a_{1,1}), \quad (5)$$

where $a_0=a_1+a_2$.

Figure 3:
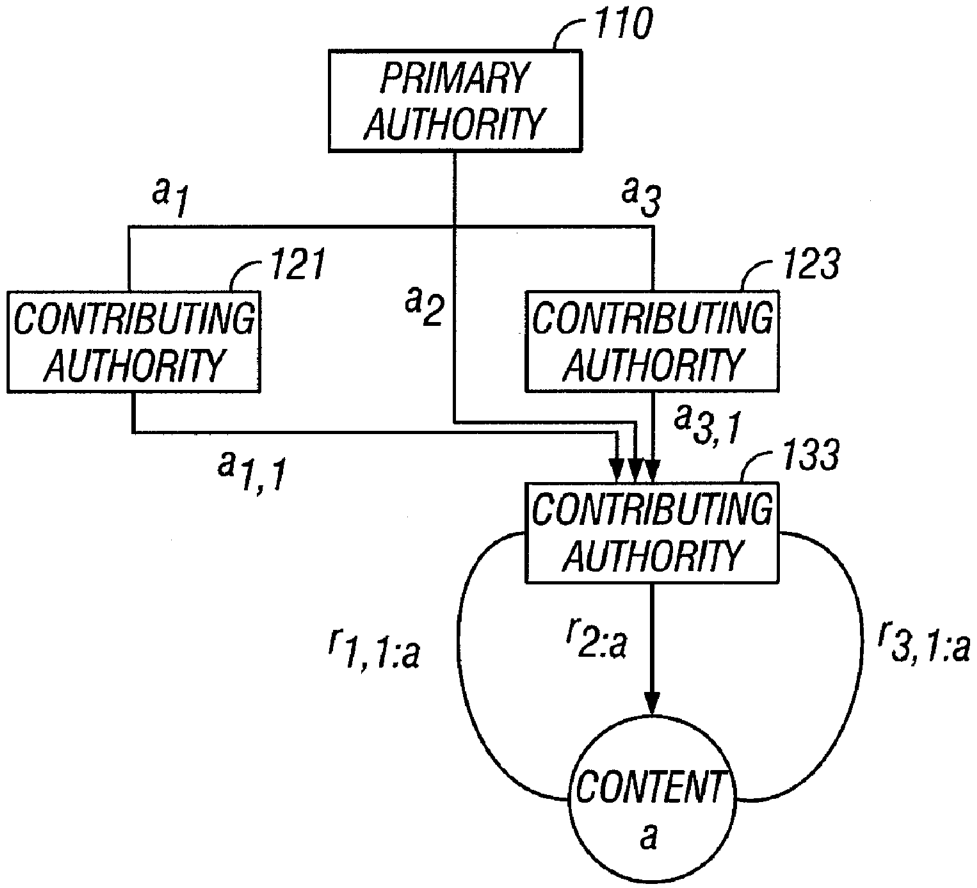
FIG. 3 shows an evaluation system according to a preferred embodiment of the invention in which a contributing authority is multiply designated.

FIG. 3 shows an evaluation system according to a preferred embodiment of the invention in which a contributing authority is multiply designated. In the particular case of FIG. 3, the contributing authority 133 has been designated both by the primary authority 110 and contributing authorities 121 and 123. Such a pattern of delegation is acceptable in the evaluation system, as both the restriction on further delegation of authority by the designated contributing authority 133 and the approaches to determining a composite rating are based upon the total authority delegated to the contributing authority. It is also possible to consider each designation as part of a separate chain of authority. For example, in FIG. 3, in rating the portion of content 156, the designated contributing authority 133 establishes three separate chains of authority. The value of the rating is the same for each chain of authority, that is, $r_{1,1:a}=r_{2:a}=r_{3,1:a}$. Notably, in the weighted average approach to computing the composite rating, acknowledging only a single chain of authority with a single total authority and acknowledging three separate chains of authority, each with a separate authority, are mathematically equivalent.

Figure 4:
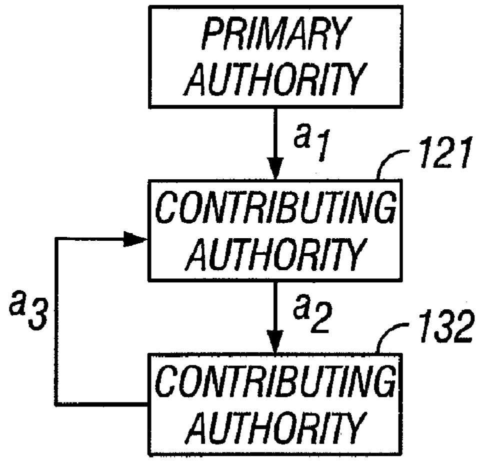
FIG. 4 shows an evaluation system in which a loop is created within a chain of authority.

FIG. 4 shows an evaluation system in which a loop is created within a chain of authority. A first contributing authority 121 has designated a second contributing authority 132, which has in turn has designated the first contributing authority. Due to the self-reinforcing nature of the loop, the quantity of authority delegated to the first and second authorities is ambiguous and potentially unbounded. Accordingly, in the preferred embodiment of the invention, the delegation process is restricted to prevent the formation of loops within a chain of authority.

A preferred restriction is based upon the concept of graph distance. By considering the evaluation system as a graph, each contributing authority may be characterized by a distance from the primary authority. The distance is defined as the number of delegations connecting the primary authority to the contributing authority along the chain of authority of shortest length. By restricting a contributing authority, characterized by a distance, from designating another contributing authority characterized by a lesser distance, loops within a chain of authority are prevented.

It is possible that with increasing distance from the primary authority, the reliability of the delegated authorities in evaluating content in a manner acceptable to the primary authority is decreased. To reflect this diminishing level of confidence with increasing distance, alternative embodiments of the invention may apply an attenuation factor to the quantity of authority that a contributing authority may delegate. Specifically, the total quantity of authority delegated by a contributing authority must not exceed the total quantity of authority it was itself delegated multiplied by an attenuation factor. The quantity of authority delegated to a contributing authority is thus attenuated with further removal from the source of the authority.

In another alternative embodiment of the invention, a primary authority or contributing authority may designate the primary authority of a separate reputation system. In this case, the primary authority is treated as a contributing authority. It is thus possible for one evaluation system to be a subset of a second evaluation system.

It should be noted that the evaluation systems of FIGS. 1-4, provided by way of example, are necessarily simple in nature. It is anticipated that an actual evaluation system would contain many more contributing authorities, some characterized by greater distances from the primary authority than shown in the figures. Furthermore, an actual evaluation system would contain many more portions of content, with each contributing authority typically evaluating many more portions of content than shown.

The ratings provided by the authorities within the evaluation system, and therefore the resulting composite rating, may apply to content of various types. For example, ratings may apply to content of different forms, e.g. actual content, such as scientific articles, tutorials, news stories, or editorials; or content referencing external items, such as products for sale or movies currently playing in theaters. The ratings may also be applied to content of various topics, such as science, biology, entertainment, and skiing.

Furthermore, there are several senses in which actual content and referenced items can be evaluated. For example, a rating may provide a measure of credibility, reflecting notions such as trustworthiness, accuracy, and impartiality. Alternatively, the rating may indicate an overall degree of excellence.

The particular notions encompassed by the ratings are not essential to the underlying methodology of the invention. It is thus anticipated that evaluation systems may be established to provide ratings encompassing these and other notions. In particular, it is anticipated that a particular primary authority may establish more than one evaluation system, each evaluating content of a different type or topic, or evaluating content in a different sense.

A primary authority may be a public entity, such as the American Medical Association, or a private entity, such as an individual with a trusted Web presence, a peer of the user, or the user himself. Preferably, the primary authority designates contributing authorities that it believes hold opinions consistent with its own opinions. Likewise, contributing authorities preferably designate additional contributing authorities with similar views. The delegation of authority thus ensures that although the primary authority may not directly evaluate a portion of content, the rating determined for the content is reflective of the opinion of the primary authority. Viewed externally, then, the composite rating obtained from the evaluation system represents the value of the content as if directly evaluated by the primary authority.

The rating returned by an evaluation system may be combined with ratings returned from other evaluation systems, to provide a single rating reflective of the combined opinions of several primary authorities. Such an approach is detailed in U.S. patent application Ser. No. 60/529,245 entitled Reputation System, filed Dec. 12, 2003. In this approach, the composite ratings returned by one or more evaluation systems are combined as specified by a personalized evaluation profile maintained by a user, and the user may freely add or remove evaluation systems from the evaluation profile as he sees fit. An evaluation system is therefore used or ignored by the community users at large, depending upon the efficacy of the evaluation system in providing ratings useful to the community of users. Accordingly, there is strong incentive for a primary authority to manage the evaluation systems judiciously. While the primary authority is preferably free to delegate as much authority to contributing authorities as it sees fit, it is important that the primary authority, and consequently the designated contributing authorities act prudently if the evaluation system is to find acceptance among the community of users.

It is anticipated that, to maintain the trust of the community of users, a primary authority may actively manage the evaluation system. For example, the primary authority may locate and designate and delegate authority to new contributing authorities. When a new contributing authority is added to the evaluation system, the relative authority of the previously designated authorities is diminished via a dilution effect. A primary authority may wish to offset this dilution by providing additional authority to one or more of the previously designated contributing authorities. Upon receiving additional authority from the primary authority, a contributing authority distributes the additional authority among the contributing authorities it has previously designated, or itself designates new contributing authorities.

Continued balancing of relative authority by issuance of additional authority may lead to an inflationary effect in which the value of each unit of authority is decreased. However, in the preferred approach to calculating the composite rating, the absolute values of the authority are not significant. Rather, the weighted average calculation considers only the relative authority of the authorities evaluating a portion of content. Continued balancing of authority by issuance of additional authority is thus an effective method of managing the evaluation system.

A primary authority may remove from the evaluation system or diminish the relative importance of a previously designated contributing authority by revoking all or a fraction of the previously delegated authority. The designated contributing authority must then revoke an equivalent quantity of authority from among the contributing authorities it has previously designated.

The above processes of adding authorities, removing authorities, and balancing relative authority levels may also be performed by the contributing authorities, subject to the aforementioned restriction that the total authority delegated by the contributing authority not exceed the quantity of authority it was itself delegated.

The ratings provided by the evaluating authorities are preferably stored as meta-data associated with the content. The invention may be practiced in conjunction with the World Wide Web, in which case the content may be located on widely distributed Web servers, and the ratings stored as meta-data markups of the content, e.g. HTML or XML tags. Alternatively, or in addition, the invention may be practiced in conjunction with a very large, distributed, annotated database such as the registry described in U.S. patent application Ser. No. 10/474,155, filed Oct. 21, 2003, entitled Knowledge Web. In this embodiment, the ratings may be stored as annotations associated with the content.

Concerns regarding falsification of ratings can be addressed using encrypted tokens, e.g. a system similar to the well known DigiCash system proposed by David Chaum (www.chaum.com). In those embodiments where authority can be retracted by the primary authority or contributing authorities, encrypted tokens with an expiration mechanism may be used.

Preferably, information identifying the rating authority is stored in conjunction with the rating. When a composite rating is to be determined for a portion of content, each authority that has evaluated the content is consulted to obtain a current level of authority for inclusion in the composite rating calculation. This consultation may not be necessary in some embodiments, though, in particular those embodiments employing the purely additive approaches to computing a composite rating. Alternatively, the authority associated with each rating may be stored as meta-data associated with the content. This approach, however, requires that a contributing authority actively update each of its ratings upon receiving additional (or losing previously granted) authority.

The storage of rating information in association with the content itself provides a notable advantage over systems that store evaluation information in a centralized server. As noted, determination of a composite rating may be performed with access to the content alone, which in turn may consult the authorities by which it was rated. However, access to a centralized server is not required to obtain a composite rating. The evaluation system is thus distributed in nature, obviating the need for a single, high capacity store of rating information capable of responding to evaluation requests from a large community of users.

The nature of the invention may be more clearly understood by considering the following example.

Figure 5:
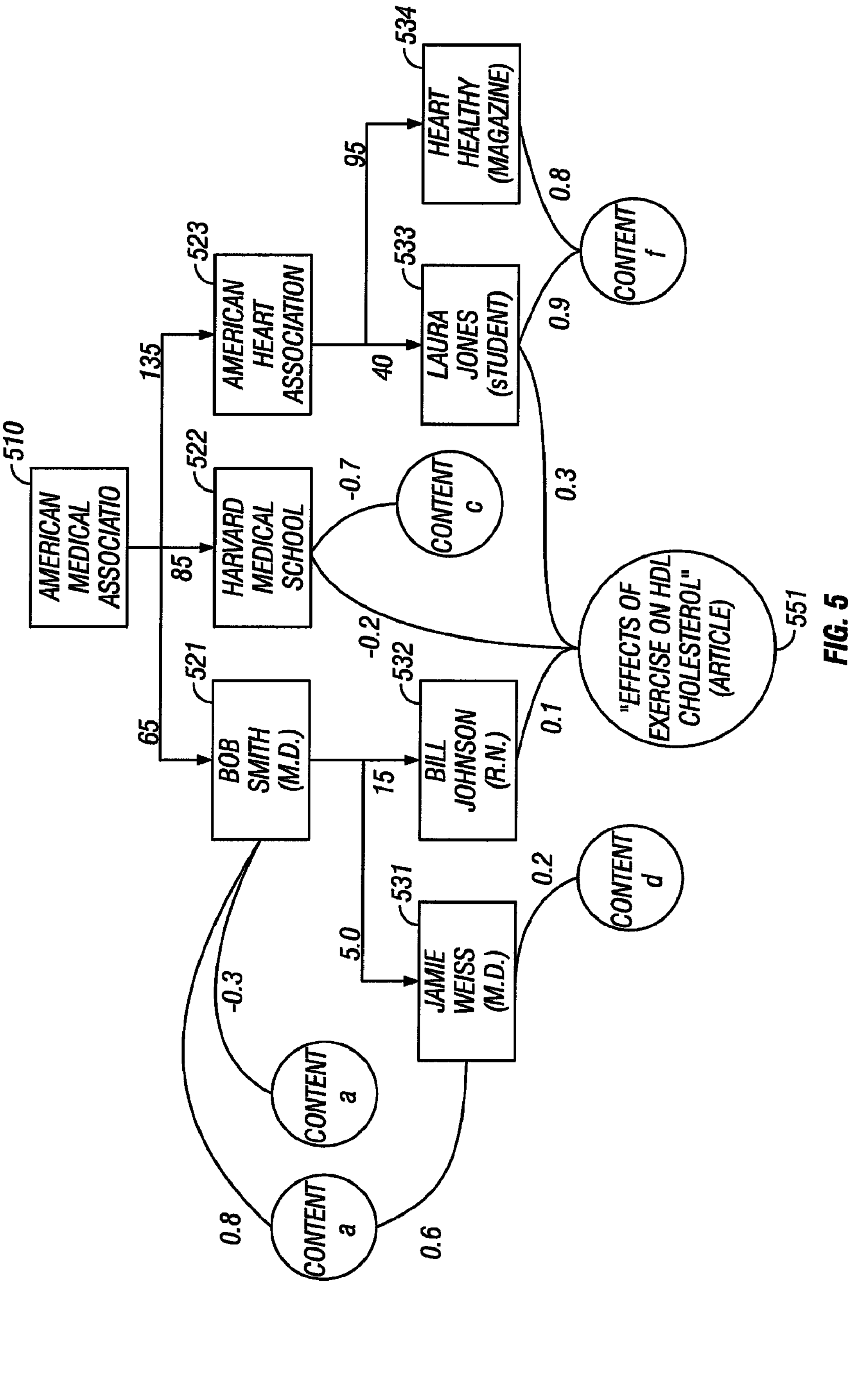
FIG. 5 shows an example evaluation system according to a preferred embodiment of the invention.

FIG. 5 shows an example evaluation system according to a preferred embodiment of the invention. Here, a patient recently diagnosed with high cholesterol has located a newspaper article entitled "Effects of Exercise on HDL Cholesterol," and would like an evaluation of the credibility of the article. The patient's personal evaluation profile indicates that for articles in the field of medicine, an evaluation system administered by the American Medical Association should be consulted.

In this evaluation system, the American Medical Association 510 has designated Bob Smith (M.D.) 521, the Harvard Medical School 522, and the American Heart Association 523 as contributing authorities by delegating 65, 85, and 135 units of authority to each, respectively. Bob Smith has in turn designated a colleague Jamie Weiss (M.D.) 531 and employee Bill Johnson (R.N.) 532 as contributing authorities, while the American Heart Association has designated a medical student, Laura Jones 533, and a magazine, Heart Healthy 534.

As can be seen in FIG. 5, the total quantity of authority delegated by each of the contributing authorities is equal to the authority that the contributing authority was itself delegated. For example, the American Heart Association has delegated 40+95=135 units of authority, the quantity of authority it was delegated by the American Medical Association.

Many of the contributing authorities have evaluated content. In particular, Bill Johnson, the Harvard Medical School, and Laura Jones have evaluated the article of interest to the patient, associating ratings of 0.1, −0.2 and 0.3 with the article, respectively. A composite rating for the article of interest may therefore be computed. Using the preferred weighted average approach, the composite rating is $$R=(15(0.1)+85(-0.2)+40(0.3))/(15+85+40)=-0.03, \quad (6)$$

indicating that the article is of lesser credibility in the opinion of the American Medical Association. Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A data processing system comprising one or more computers and one or more storage devices, the one or more computers configured to perform operations comprising:

receiving information identifying a primary authority from among a plurality of rating authorities;

assigning the primary authority complete authority to rate content;

receiving information originating from the primary authority delegating at least a portion of the complete authority to one or more contributing authorities;

receiving information specifying content ratings for a first content item by two or more authorities;

determining a composite rating for the first content item based on the content ratings, wherein the composite rating is determined by combining the content ratings according to the portion of the complete authority that is held by each of the two or more authorities that rated the first content item;

receiving information from a particular user that indicates that an evaluation system using the primary authority should be used to rate the first content item; and transmitting the composite rating for the first content item for presentation to the particular user in association with the first content item.

2. The system of claim 1, wherein at least a portion of the complete authority is specified numerically.

3. The system of claim 1, wherein content ratings are specified numerically as numeric ratings selected from among a group of numeric ratings consisting of:

numbers between −1 and +1, inclusively; or numbers between 0 and +1, inclusively.

4. The system of claim 3, wherein the composite rating comprises a combination of numeric ratings selected from among a group of composite ratings selected from among:

an additive combination of the numeric ratings;

a mean of the numeric ratings;

a mode of the numeric ratings; and a median of the numeric ratings.

5. The system of claim 3, wherein the composite rating comprises a weighted average of the numeric ratings, wherein each of the numeric ratings are weighted in proportion to a respective quantity of authority held by the authority.

6. The system of claim 1, wherein the content ratings indicate one or more qualities of the first content item selected from among a list of qualities consisting of:

reliability;

trustworthiness;

accuracy;

impartiality; and quality.

7. The system of claim 1, wherein the operations further comprise receiving instructions from the primary authority limiting evaluation of content to content of a particular form.

8. The system of claim 1, wherein the operations further comprise:

receiving information originating from an existing authority adding one or more new contributing authorities by delegating authority to the one or more new contributing authorities.

9. The system of claim 1, wherein the operations further comprise:

receiving information originating from a delegating authority removing one or more of the contributing authorities by removing authority previously delegated to one or more contributing authorities by the delegating authority.

10. The system of claim 1, wherein the operations further comprise:

adjusting a relative authority of any of the one or more contributing authorities in response to any of:

information originating from the primary authority delegating additional authority to at least one additional contributing authority; or information originating from the primary authority withdrawing authority from at least one of the one or more contributing authorities.

11. The system of claim 1, wherein the operations further comprise:

adding one or more new contributing authorities in response to information identifying that one or more contributing authorities have delegated authority to the one or more new contributing authorities.

12. The system of claim 11, wherein the operations further comprise:

removing a contributing authority by withdrawing authority previously delegated to the one or more new contributing authorities.

13. The system of claim 11, wherein the operations further comprise:

adjusting relative authority of the one or more new contributing authorities by any of:

delegating additional authority to at least one additional new contributing authority; or withdrawing authority from at least one of the one or more new contributing authorities.

14. The system of claim 1, wherein a delegating authority cannot delegate more authority than the delegating authority has.

15. The system of claim 1, wherein a delegating authority cannot delegate more authority than the delegating authority has, reduced by an attenuation factor.

16. The system of claim 1, wherein the operations further comprise:

preventing each of the one or more contributing authorities from designating another of the one or more contributing authorities, to avoid creating a loop of designated authorities.

17. The system of claim 1, wherein the information that indicates that an evaluation system using the primary authority should be used to rate the first content item comprises an indication on an evaluation profile of the particular user that the evaluation system using the primary authority should be used to rate the first content item.

18. A method comprising:

receiving information identifying a primary authority from among a plurality of rating authorities;

assigning the primary authority complete authority to rate content;

receiving information originating from the primary authority delegating at least a portion of the complete authority to one or more contributing authorities;

receiving information specifying content ratings for a first content item by two or more authorities;

determining, using one or more computers, a composite rating for the first content item based on the content ratings, wherein the composite rating is determined by combining the content ratings according to the portion of the complete authority that is held by each of the two or more authorities that rated the first content item;

receiving information from a particular user that indicates that an evaluation system using the primary authority should be used to rate the first content item; and transmitting the composite rating for the first content item for presentation to the particular user in association with the first content item.

19. The method of claim 18, wherein at least a portion of the complete authority is specified numerically.

20. The method of claim 18, wherein content ratings are specified numerically as numeric ratings selected from among a group of numeric ratings consisting of:

numbers between −1 and +1, inclusively; or numbers between 0 and +1, inclusively.

21. The method of claim 18, wherein the composite rating comprises a combination of numeric ratings selected from among a group of composite ratings selected from among:

an additive combination of the numeric ratings;

a mean of the numeric ratings;

a mode of the numeric ratings; and a median of the numeric ratings.

22. The method of claim 20, wherein the composite rating comprises a weighted average of the numeric ratings, wherein each of the numeric ratings are weighted in proportion to a respective quantity of authority held by the authority.

23. The method of claim 18, wherein the content ratings indicate one or more qualities of the first content item selected from among a list of qualities consisting of:

reliability;

trustworthiness;

accuracy;

impartiality; and quality.

24. The method of claim 18, further comprising:

receiving instructions from the primary authority limiting evaluation of content to content of a particular form.

25. The method of claim 18, further comprising:

receiving information originating from an existing authority adding one or more new contributing authorities by delegating authority to the one or more new contributing authorities.

26. The method of claim 18, further comprising:

receiving information originating from a delegating authority removing one or more of the contributing authorities by removing authority previously delegated to one or more contributing authorities by the delegating authority.

27. The method of claim 18, further comprising: adjusting a relative authority of any of the one or more contributing authorities in response to any of:

information originating from the primary authority delegating additional authority to at least one additional contributing authority; or information originating from the primary authority withdrawing authority from at least one of the one or more contributing authorities.

28. The method of claim 18, further comprising:

adding one or more new contributing authorities in response to information identifying that one or more contributing authorities have delegated authority to the one or more new contributing authorities.

29. The method of claim 28, further comprising:

removing a contributing authority by withdrawing authority previously delegated to the one or more new contributing authorities.

30. The method of claim 28, further comprising:

adjusting relative authority of the one or more new contributing authorities by any of: delegating additional authority to at least one additional new contributing authority; or withdrawing authority from at least one of the one or more new contributing authorities.

31. The method of claim 18, wherein a delegating authority cannot delegate more authority than the delegating authority has.

32. The method of claim 18, wherein a delegating authority cannot delegate more authority than the delegating authority has, reduced by an attenuation factor.

33. The method of claim 18, further comprising:

preventing each of the one or more contributing authorities from designating another of the one or more contributing authorities, to avoid creating a loop of designated authorities.

34. The method of claim 18, wherein the information that indicates that an evaluation system using the primary authority should be used to rate the first content item comprises an indication on an evaluation profile of the particular user that the evaluation system using the primary authority should be used to rate the first content item.

* * * * *

UNITED STATES PATENT AND TRADEMARK OFFICE

CERTIFICATE OF CORRECTION

PATENT NO. : 8,069,175 B2
APPLICATION NO. : 12/731011
DATED : November 29, 2011
INVENTOR(S) : W. Daniel Hillis and Bran Ferren It is certified that error appears in the above-identified patent and that said Letters Patent is hereby corrected as shown below:

On the Title pg. (Related U.S. Application Data), after "Item (63) Continuation of application No. 10/854,662, filed as application No. PCT/US02/11434 on Apr. 10, 2002, now Pat. No. 7,844,610.", insert new field below Item -- (60) Provisional application No. 60/529,245, filed on Oct. 21, 2003 --.

On Col. 11, lines 37-39 and on Col. 12, lines 1-6, delete "27. The method of claim 18, further comprising: adjusting a relative authority of any of the one or more contributing authorities in response to any of:

information originating from the primary authority delegating additional authority to at least one additional contributing authority; or information originating from the primary authority withdrawing authority from at least one of the one or more contributing authorities." and insert -- 27. The method of claim 18, further comprising:

adjusting a relative authority of any of the one or more contributing authorities in response to any of:

information originating from the primary authority delegating additional authority to at least one additional contributing authority; or information originating from the primary authority withdrawing authority from at least one of the one or more contributing authorities. --

Signed and Sealed this
Tenth Day of July, 2012

David J. Kappos
*Director of the United States Patent and Trademark Office*